United States Patent
Smith et al.

(10) Patent No.: US 6,833,165 B2
(45) Date of Patent: Dec. 21, 2004

(54) THERMALLY SPRAYED COATINGS

(75) Inventors: Thomas J. Smith, Muskegon, MI (US); Thomas Stong, Kent City, MI (US); Peter Einberger, Muskegon, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/255,814

(22) Filed: Sep. 26, 2002

(65) Prior Publication Data

US 2004/0037969 A1 Feb. 26, 2004

Related U.S. Application Data

(63) Continuation-in-part of application No. 10/227,896, filed on Aug. 26, 2002, now Pat. No. 6,780,474.

(51) Int. Cl.⁷ .............................. C23C 4/06; C23C 4/10
(52) U.S. Cl. .................. 427/451; 427/452; 427/456; 427/446
(58) Field of Search .................. 427/446, 455, 427/456, 450, 451, 452

(56) References Cited

U.S. PATENT DOCUMENTS

| | | | |
|---|---|---|---|
| 3,016,447 A | * | 1/1962 | Gage et al. ............... 219/76.15 |
| 3,941,903 A | * | 3/1976 | Tucker, Jr. .................. 427/451 |
| 4,387,140 A | | 6/1983 | Kondo et al. |
| 4,596,282 A | | 6/1986 | Maddy et al. |
| 4,863,661 A | | 9/1989 | Maddy |
| 4,985,092 A | | 1/1991 | Kaede et al. |
| 5,126,104 A | | 6/1992 | Anand et al. |
| 5,292,382 A | | 3/1994 | Longo |
| 5,587,227 A | | 12/1996 | Ooya |
| 5,601,293 A | | 2/1997 | Fukutome et al. |
| 5,618,590 A | | 4/1997 | Naruse et al. |
| 5,713,129 A | * | 2/1998 | Rastegar et al. ......... 29/888.04 |
| 5,763,106 A | | 6/1998 | Blanchard et al. |

FOREIGN PATENT DOCUMENTS

| | | |
|---|---|---|
| DE | 197 21 818 A1 * | 12/1998 |
| JP | 59150080 A1 | 8/1984 |
| JP | 09196176 | 7/1997 |
| JP | 09152035 A1 | 10/1997 |

OTHER PUBLICATIONS

Metals Handbook Ninth Edition, vol. 5 "Surface Cleaning, Finishing, and Coating", American Society for Metals, 1982, p. 363.*

* cited by examiner

*Primary Examiner*—Katherine Bareford
(74) *Attorney, Agent, or Firm*—Rader, Fishman & Grauer, PLLC

(57) ABSTRACT

The present invention relates to a method including thermal spraying a chromium nitride or a chromium carbide and chromium silicide coating material on to an article. The coating material may be in a powder form before thermal spraying. In one aspect, the thermal spraying includes melting the coating material, propelling the molten coating material toward the article to be coated, and coating the article with the molten coating material. In another aspect, the coated article is one or more piston rings.

16 Claims, 1 Drawing Sheet

THERMALLY SPRAYED COATINGS

This application is a continuation-in-part of U.S. patent application Ser. No. 10/227,896 filed Aug. 26, 2002, now U.S. Pat. No. 6,780,474.

This invention relates to an improved method for creating wear resistant articles.

BACKGROUND OF THE INVENTION

A particular problem with known piston rings is that they are not sufficiently resistant to wear. Improved wear resistance has been accomplished through selection of piston ring base materials. In addition, increased wear resistance has been achieved by coating the piston ring base material with a coating material which has improved wear resistance as compared to the base material. Typical coatings including nitrides, carbides, chromium plating, and ceramic plating. However, known processes for applying these coating are expensive and time consuming.

For example, physical vapor deposition (PVD) of a coating material is known in the art. PVD utilizes a vacuum chamber in which the coating material is evaporated. In one method, chromium metal anodes are utilized. The anodes are vaporized and the chromium becomes nitrided with the introduction of a quantity of nitrogen ions. An electrical potential passed through the articles to be coated ensures that the coating material is deposited on the articles. While providing acceptable wear resistance, the process is expensive. The necessary machinery is expensive and complicated to operate. Further, the PVD process can be cumbersome, thus creating a long cycle time. In addition, PVD is unable to provide a layer of coating material that is consistent or sufficient thickness.

For at least these reasons, the inventors have recognized the need for an improved method for creating wear resistant articles that is more economical, has a shorter cycle time and is capable of producing layers of coating materials that are consistent in thickness and as well as being relatively thick.

DETAILED DESCRIPTION

Figure 1:
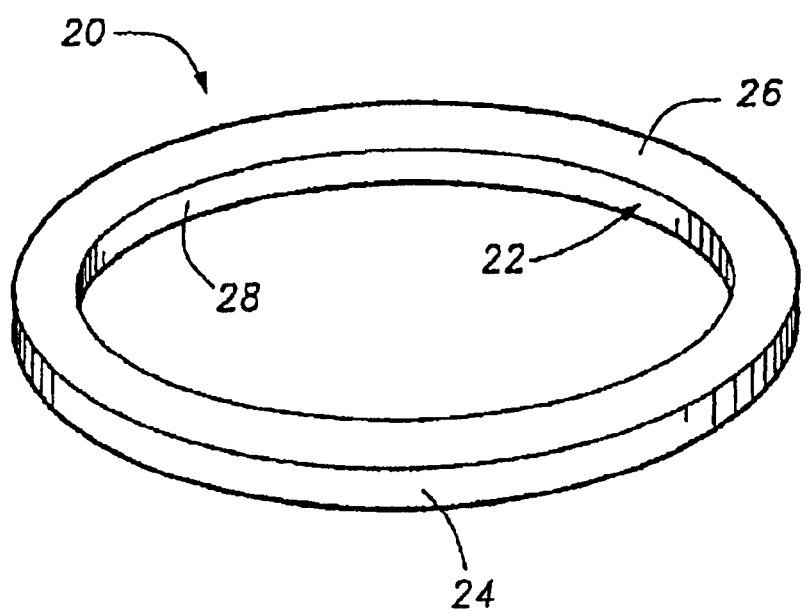
FIG. 1 shows a perspective view of a piston ring that may be coated according to the present invention.

The present invention includes applying a coating material to an article through the use of a thermal spraying technique.

The coating material may have a base of any metal, alloy, compound or composition that is suitable for application by thermal spraying. Suitable metals include chromium, molybdenum, nickel and/or cobalt. Suitable alloys include those that have chromium, molybdenum, nickel and/or cobalt. Preferred compounds include those that combine metals with non-metals. In one aspect, compounds that combine nitride and carbide are preferred base coating materials. The most preferred base coating material of this aspect is chromium nitride compound (CrN). Preferred compositions include those that combine two different metal/non-metal compounds into one composition. In this aspect, preferred compositions combine chromium carbide (CrC) with chromium silicide (CrSi).

Coating material may contain other, additional components such as metals and alloys. Useful additional components include, inter alia, molybdenum, nickel-chromium (Ni—Cr) alloys and cobalt alloys. Preferably, the base coating material may be present in amounts of 50–99 wt % with the balance being any of the variety of additional components.

One useful coating material includes CrN as the base coating material and Ni—Cr alloy as an additional component. CrN may be present in amounts from about 50–90 wt % with the balance Ni—Cr alloy. The most preferred coating material is about 70 wt % CrN and about 30 wt % Ni—Cr alloy. The Ni—Cr alloy may contain 40–60 wt % chromium and preferably 10–30% chromium with the balance nickel.

Another useful coating material includes CrC and CrSi as the base coating material and Ni—Cr alloy as an additional component. The CrC/CrSi base coating material may be present in the amounts from about 50–99 wt % with the balance Cr—Ni alloy. The CrC/CrSi base coating material includes 75–95 wt % chromium, 2–15 wt % silicon and 1–10 wt % carbon. More preferred, the base coating material includes 85–90 wt % chromium, 7–10 wt % silicon and 3.5–5.0 wt % carbon. The Cr—Ni alloy includes 10–20 wt % chromium, 1–10 wt % iron, 3–6 wt % silicon, 1–5 wt % boron with the balance nickel. More preferred, the Cr—Ni alloy includes 13–17 wt % chromium, 3–6 wt % iron, 4–5 wt % silicon and 2.75–3.5 wt % boron with the balance nickel. The most preferred composition is about 70 wt % CrC/CrSi base coating material and about 30 wt % Cr—Ni alloy.

The size, shape and composition of the article are not critical to the present invention. One preferred article is a piston ring, as seen in FIG. 1. Piston ring 20 has an outer surface 22 that includes an outer peripheral face 24, an upper axial surface 24 and a lower axial surface 28. In use, outer peripheral face 24 contacts an inner wall of a cylinder (not shown)

The disclosed coating materials may be thermal sprayed onto an article. Thermal spraying is a process that deposits a coating onto an article and includes propelling a melted coating material to the article. Specifically, in a heat source the coating material becomes molten. The molten coating material is carried in a gas stream to the article to be coated where the coating material contacts the article. The molten coating material typically has a particle size in the range of 15–200 µm.

Thermal spraying exhibits several advantages over PVD. The equipment is comparatively less expensive to purchase and easier to operate. The cycle time is relatively short, meaning that more articles may be coated quicker. Thermal spraying also allows coating materials to be applied evenly over the entire article. Preferred coating thicknesses are in the range of 50–200 µm. However, the thickness of the applied coating is also comparatively unlimited and may be on the order of 200 µm or more. Such a high level of thickness allows the article to be processed after coating without risking the overall integrity of the coating material. For example, the article may be, inter alia, fused, honed, ground, shaped or polished.

Any thermal spraying process may be used in the present invention. While processes that employ a powdered coating material are preferred, processes that employ wire coating materials may also be suitable. For example, a gas combustion/wire process continuously feeds a wire of the coating material into a nozzle. A fuel gas, e.g., acetylene or propane, is mixed with oxygen and burned to produce a flame in the nozzle at the tip of the wire. The wire consequently melts and is atomized. The molten coating material is propelled to the article by a carrier gas, e.g., compressed air. Two wire electric arc processes may also be utilized.

In a gas combustion/powder process, the coating material, in the form of a powder, is aspirated into a fuel and oxygen flame. The molten coating material is propelled to the article by the hot gases, i.e., the aspirating gas and the by product gases of combustion. Although the flame temperature may reach 3000° C., the article being coated rarely reaches a temperature of greater than 150° C.

One preferred process is a high-velocity oxy-fuel (HVOF) process in which a gun-like barrel is filled with a measured amount of powdered coating material, fuel gas, and oxygen. The mixture is ignited by a spark. The heat of the explosion melts the coating material and the expanding gases propel the molten material to the article. Numerous different devices that carry out HVOF process are available on the market, including those from Praxair, Inc.

Another preferred process is a plasma/powder process in which a fuel gas, e.g. an argon/hydrogen mixture, an argon/nitrogen mixture, a nitrogen/helium mixture or an argon/helium mixture, is passed through a sustained electric arc. The electric arc is typically created between a tungsten cathode and a concentric copper anode that form a chamber through which the fuel gas is passed. The electric arc creates a plasma flame. The powder coating material is injected into the plasma flame, which melts and propels the coating material to the article.

Oxidation of the coating material may cause lower quality coatings. Oxidation occurs primarily in the time period between the time the coating material is melted and the time the coating material contacts the article to be coated. This may also be termed the flight time. Minimization of the flight time minimizes oxidation. Minimizing the flight time can be accomplished by decreasing the distance to the article to be coated. For example, standard placement of the articles is about 3.5 inches from the heat source of the thermal sprayer. Moving the article even a half inch closer to the heat source will decrease the amount of oxidation. Preferably, the article is moved so that it is about 2.5 inches from the heat source of the thermal sprayer. In a HVOF process, then length of the barrel may be shortened, thus effectively reducing the flight time and the oxidation of the coating material.

In thermal spraying processes that utilize a carrier gas, flight time and oxidation can be decreased by increasing flow rate of the carrier gas. In a plasma process, increasing the flow rate of the plasma can be accomplished by using a greater volume of fuel gas in a given time period, increasing the voltage and/or the amperage used to create the electric arc, and/or using different fuel gas mixture to generate the plasma flame. For example, typically fuel gas is used at a volume of around 100 standard cubic feet/hour (cfh). Increasing the volume of fuel gas to more than 200 cfh will decrease oxidation. Increasing the voltage and amperage from the typical 30 volts and 600 amps to 50–70 volts and 800–1000 amps has the effect of decreasing oxidation. Preferably, a voltage of about 60 volts is used in combination with amperage of about 900 amps. Indeed, a fuel gas of argon and helium allows less oxidation than a fuel gas of argon and hydrogen. In a preferred method, an argon/helium fuel gas is used at a volume of 200 cfh of argon and a volume of 30 cfh helium. Obviously, using more than one of these techniques may have a synergistic effect on the reduction of oxidation of the coating material.

As used in this application, "melt" and "molten" and their word forms are to be construed broadly. These words describe situations where the coating material makes a complete phase change from solid to liquid as well as situations where only a partial phase change occurs in the coating material. For example, the coating material may only be softened or plasticized in the heating or melting step of the thermal spraying process. "Melt" and "molten" should be construed to include any situation where the coating material is just soft enough to adhere to itself and to the article to be coated.

Furthermore, as used in this application, chromium nitride, CrN, chromium carbide, CrC, chromium silicide and CrSi are to be construed broadly. These words and abbreviations are used as shorthand for a range compounds where the ratio of component atoms are not necessarily one to one. For example, CrN may denote $Cr_1N_1$ as well as $Cr_2N_1$ and chromium silicide may denote $Cr_1Si_1$ as well as $Cr_3Si_1$. Indeed, any ratio of component atoms may be used.

While the invention has been specifically described in connection with piston rings, it is to be understood that this is by way of illustration and not of limitation. The scope of the appended claims should be construed to cover any article, whether metal or otherwise, that may benefit from a coating that increases wear resistance. Further, the appended claims should be construed as broadly as the prior art will permit.

What is claimed is:

1. A method comprising:
   thermal spraying a coating material on an article,
   wherein said coating material is about 50–90 wt % chromium nitride and the balance nickel-chromium alloy.

2. The method of claim 1, wherein said coating material is a powdered coating material.

3. The method of claim 1, wherein said article is a piston ring.

4. The method of claim 1, wherein said thermal spraying step further includes:
   melting said coating material;
   propelling said molten coating material toward said article; and
   coating said article with said molten coating material.

5. The method of claim 4, wherein said coating step includes coating said article to a thickness of 50–200 μm.

6. The method of claim 4, wherein said melting step includes melting said coating material in a fuel and oxygen flame.

7. The method of claim 4, wherein said melting step includes melting said coating material in a plasma flame.

8. The method of claim 7, wherein said melting step includes creating said plasma flame by passing a fuel gas through an electric arc powered by 60 volts and 900 amps.

9. The method of claim 7, wherein said melting step includes creating said plasma flame with an argon and helium fuel gas.

10. The method of claim 7, wherein said melting step includes creating said plasma flame with more than 200 standard cubic feet/hour of fuel gas.

11. The method of claim 1, further comprising processing said article after the coating step.

12. A method comprising:
    melting a chromium nitride coating material in a plasma flame, wherein said coating material is about 50–90 wt % chromium nitride and the balance nickel-chromium alloy;
    propelling said molten coating material to a piston ring; and
    coating said piston ring with said molten coating material, wherein said melting step is selected from the following group: providing a fuel gas flow rate of at least 200 standard cubic feet/hour, providing an electric arc plasma flame with at least 50 volts and 800 amps, providing a fuel gas of argon and helium, and combinations thereof.

13. A method comprising:

thermal spraying a coating material on an article, wherein said coating material is about 50–99 wt % chromium carbide and chromium suicide and the balance nickel-chromium alloy.

14. The method of claim 13, wherein said coating material is about 70 wt % chromium carbide and chromium silicide.

15. A method comprising:

thermal spraying a coating material on an article;

wherein said coating material includes chromium carbide and chromium suicide;

wherein said coating material is about 50–90 wt % chromium carbide and chromium silicide and the balance nickel-chromium alloy.

16. The method of claim 15, wherein said coating material is about 70 wt % chromium carbide and chromium silicide.

* * * * *